United States Patent [19]

Kiyota et al.

[11] Patent Number: 5,296,653
[45] Date of Patent: Mar. 22, 1994

[54] DEVICE HAVING A MULTI-LAYERED CONDUCTOR STRUCTURE

[75] Inventors: Toshiya Kiyota, Tokyo; Mitsushi Ikeda, Yokohama; Meiko Ogawa, Tokyo; Yoshifumi Ogawa, Kawasaki; Michio Murooka, Tokyo, all of Japan

[73] Assignee: Kabushiki Kaisha Toshiba, Kawasaki, Japan

[21] Appl. No.: 987,601

[22] Filed: Dec. 9, 1992

[30] Foreign Application Priority Data

Dec. 9, 1991 [JP] Japan .................. 3-324647
Sep. 14, 1992 [JP] Japan .................. 4-271084

[51] Int. Cl.⁵ ............................... H05K 1/00
[52] U.S. Cl. ..................... 174/250; 174/257
[58] Field of Search ........... 174/250, 257, 255, 256, 174/258; 361/412, 414

[56] References Cited

U.S. PATENT DOCUMENTS 4,094,059 6/1978 Tachikawa et al. .
5,006,054 4/1991 Nikkola .
5,026,273 6/1991 Cornelison .
5,162,933 11/1992 Kabeuda et al. .

FOREIGN PATENT DOCUMENTS 1134426 5/1989 Japan .
2230756 9/1990 Japan .

*Primary Examiner*—Leo P. Picard
*Assistant Examiner*—Cheryl R. Figlin
*Attorney, Agent, or Firm*—Oblon, Spivak, McClelland, Maier & Neustadt

[57] ABSTRACT

A multi-layered conductor structure device has a substrate, a first conductor layer formed on the substrate, which provides an electrode or wiring, and an insulating film covering the first conductor layer and the substrate. On the insulating film, a second conductor layer is formed which comprises an indium tin oxide, and which provides an electrode or wiring. The first conductor layer is formed of an alloy of aluminum with copper, gold, boron, bismuth, cobalt, chromium, germanium, iron, molybdenum, niobium, nickel, palladium, platinum, tantalum, titanium, tungsten, and/or silver.

19 Claims, 6 Drawing Sheets

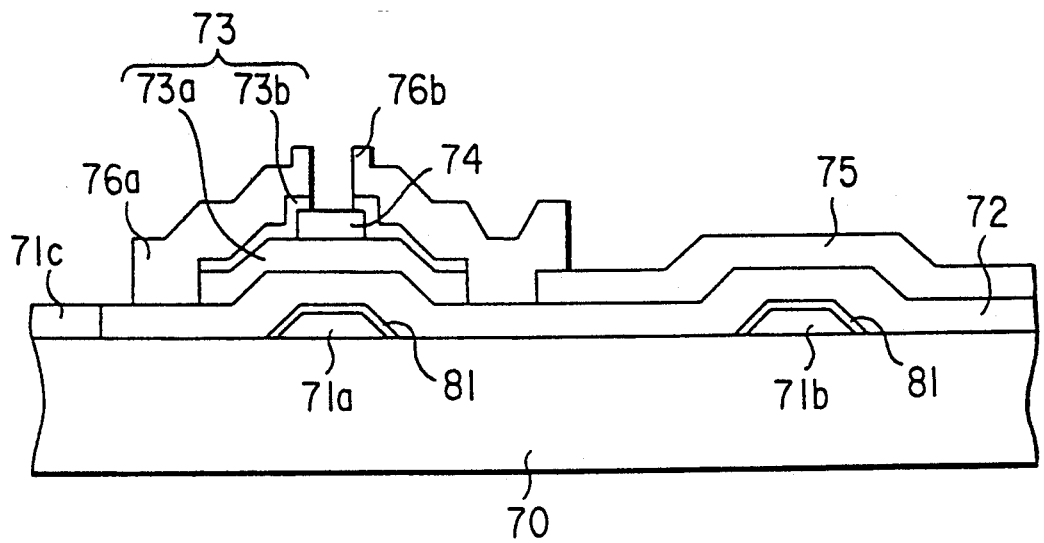
F I G. 11
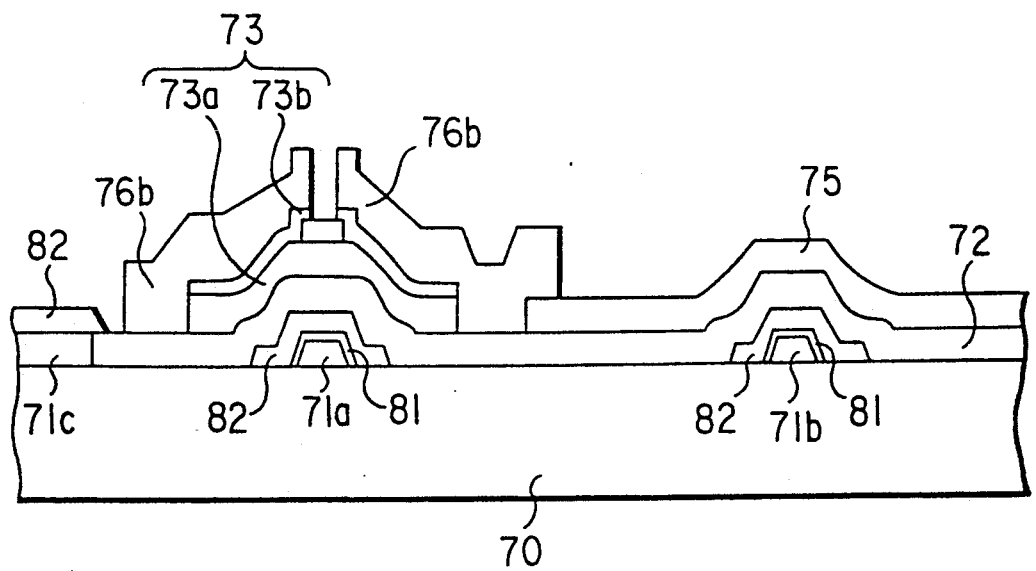
F I G. 12

DEVICE HAVING A MULTI-LAYERED CONDUCTOR STRUCTURE

BACKGROUND OF THE INVENTION

1. Field of the Invention

The present invention relates to a device having a multi-layered conductor structure including a transparent conductor layer comprising indium tin oxide (ITO), such as a liquid crystal display device, a charge coupled device (CCD), or a photoconductor stacked solid imaging device (PSID).

2. Description of the Related Art

A multi-layered conductor structure device, such as liquid crystal display device, CCD or PSID, is known which has, on a substrate, a first conductor layer which provides an electrode or wiring, an insulating film covering the first conductor layer and the substrate, and a second conductor layer formed on the insulating film and comprising ITO, which provides an electrode or wiring. For such a device, it is required that the first conductor layer have a low resistivity, and also have a high resistance to an etching liquid (a mixed liquid of nitric acid and hydrochloric acid) used for patterning the second ITO conductor layer.

Taking a liquid crystal display device as an example, an attention is greatly attracted to an active matrix type liquid crystal device provided with a thin film transistor (TFT) using an amorphous silicon (a-Si) film, as a switching element. It will be able to realize a large-area, highly fine, and high image quality panel display (a flat television) by constituting a TFT array using an a-Si film which can be produced at a low temperature on an inexpensive amorphous glass substrate.

In order for the active matrix type liquid crystal display device to display highly fine image, and have a large area, and an increased opening ratio of a pixel, it is necessary to make thin and long the signal lines to TFT, i.e., gate electrode wiring (gate line), or data wiring (data line). Further, in order to remove waveform distortion of the pulsed signals, it is necessary to sufficiently lower the resistivity of the wirings. Thus, the wiring materials must have a sufficiently small resistivity. For example, when a reverse stagger type TFT structure wherein a gate line is formed on a glass substrate, on which a TFT is formed by stacking an insulating film and a-Si film, is used, it is required that the gate line have a thin thickness and a sufficiently small resistivity, and can withstand chemical treatments performed during subsequent processes.

More specifically, a liquid crystal display device generally has an ITO electrode as a pixel electrode. In patterning the ITO electrode, an etching liquid for ITO (a mixed liquid of hydrochloric acid and nitric acid) contacts the gate line or the like through pinholes in the insulating film below the ITO. In such a case, the gate line material is corroded by the ITO-etching liquid, leading to the breakage of the gate line, unless the gate line material has a sufficient resistance to the ITO etching liquid.

As a gate line material which satisfies the above requirements to some extent, a metal film such as tantalum or titanium, or an alloy thereof (e.g., an Mo-Ta alloy disclosed in Published Examined Japanese Patent Application (kokoku) 61-48910) has been used. However, in order to realize a large-area, highly fine display device, a material is required which has a smaller resistivity, a good processability, and high resistance to chemicals during chemical treatments, particularly ITO patterning.

As a lower-resistivity material, a metal such as gold, aluminum, copper or platinum is being considered. However, if a storage capacitor line (Cs line) is formed of aluminum or copper, the Cs line would be broken during the subsequent process, since these metals have a poor resistance to etching liquids used to etch ITO, aluminum, silicon oxide, and silicon nitride. Further, gold, copper and platinum has a poor adhesivity with a substrate, often peeling off the substrate.

In the case of stagger type TFT structure wherein source and drain electrode wirings are formed on a substrate surface, the above properties or requirements are required for the source and drain electrode materials. In addition, the similar problems exist on liquid crystal display devices in general, and more generally on a device having a multi-layered conductor structure (including CCD and PSID) in which a conductor layer of ITO and various electrodes or wiring layers are laminated on each other through an insulating film.

SUMMARY OF THE INVENTION

Therefore, it is an object of the present invention to provide a device having multi-layered conductor structure, which includes an electrical conductor layer having a low resistivity, a high resistance to chemicals, particularly a high etching resistance to an etching liquid for ITO, and good adhesivity with a substrate.

According to the present invention, there is provided a device having a multi-layered conductor structure:

a substrate;

a first conductor layer formed on the substrate, which provides an electrode or wiring;

an insulating film covering the first conductor layer and the substrate; and a second conductor layer formed on the insulating film, and comprising an indium tin oxide, which provides an electrode or wiring;

wherein said first conductor layer is formed of an alloy of aluminum (Al) with at least one element selected from copper (Cu), gold (Au), boron (B), bismuth (Bi), cobalt (Co), chromium (Cr), germanium (Ge), iron (Fe), molybdenum (Mo), niobium (Nb), nickel (Ni), palladium (Pd), platinum (Pt), tantalum (Ta), titanium (Ti), tungsten (W), and silver (Ag).

The alloy of the invention (hereinafter referred to also as "conductor material") which forms the first conductor layer is particularly preferably an aluminum-copper ally containing 10 to 95 atomic % of copper.

Further, in order to further alleviate defects due to the breakage of the first layer during etching, the first conductor layer can be covered with a high-melting point metal, or an insulating material comprising tantalum oxide or an oxide containing tantalum (the latter material will be referred to as "tantalum oxidic insulating material"). In particular, since the tantalum oxidic insulating material has a high relative dielectric constant, it can greatly reduce the areas of the TFT and capacitive storage lines.

In addition, the chemical resistance of the first conductor layer can further be increased and also the adhesivity of the first conductor layer with an insulating film formed thereon can be increased, by oxidizing, nitriding, boriding, carbonizing or siliciding the surface thereof.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 is a cross-sectional view showing the fifth embodiment of the present invention; and FIG. 12 is a cross-sectional view showing the sixth embodiment of the present invention.

DETAILED DESCRIPTION OF THE PREFERRED EMBODIMENTS

Figure 1:
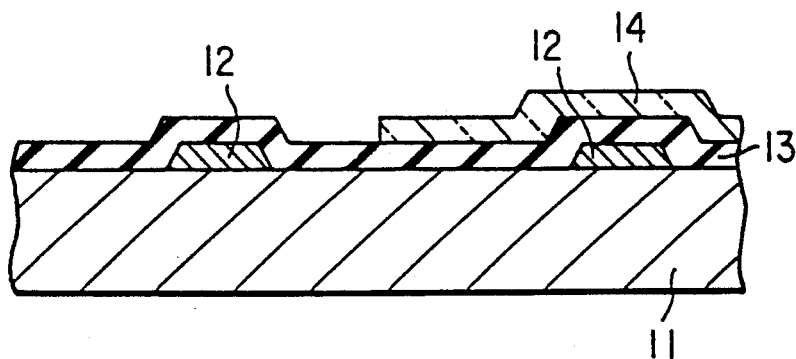
FIG. 1 shows a basic structure illustrating a multi-layered conductor structure device of the present invention.

The present invention will be explained in detail with reference to the drawing.

FIG. 1 shows a basic structure of a device according to the present invention. The device has a substrate 11, on which a first conductor layer 12 formed of the conductor material of the invention is formed in a predetermined pattern. The first conductor layer 12 functions as an electrode or a wiring. Covering the first conductor layer 12 and the exposed portion of the substrate 11, there is formed an insulating film 13. A second conductor layer 14 of ITO is formed on the insulating film 13. The second conductor layer 14 also functions as an electrode or a wiring.

The conductor material of the present invention which forms the first conductor layer 12 is an alloy of aluminum with a specified element. The element which constitutes an alloy with aluminum (hereinafter referred to as "alloying element") is a high-melting point element having a melting point higher than aluminum, and is selected from Cu, Au, B, Bi, Co, Cr, Ge, Fe, Mo, Nb, Ni, Pd, Pt, Ta, Ti, W, and/or Ag. In general, the alloying element occupies 1 to 95 atomic % of the aluminum alloy. In particular, to obtain high resistance to an acid and good adhesivity with a substrate, it is desirable that the total amount of the alloying element be 5 to 90 atomic %. However, in the case of an Al-Cu alloy, the amount of the alloying element, Cu, is preferably 10 to 95 atomic %. Al-Cu alloys containing 10 to 50 atomic % of Cu, or 65 to 95 atomic % of Cu exhibit particularly high resistance to an acid and good adhesivity with a substrate, and has a resistivity lower than that of an Mo-Ta alloy, while Al-Cu alloys containing 15 to 30 atomic % exhibit particularly low resistivity. Al-Cu alloys containing 15 to 65 atomic % or 85 to less than 100 atomic % of Cu exhibit a satisfactory resistance to the ITO-etching alloy.

The conductor material of the present invention is good in adhesivity with a substrate, low in resistivity and high in resistance to chemicals.

Figure 2:
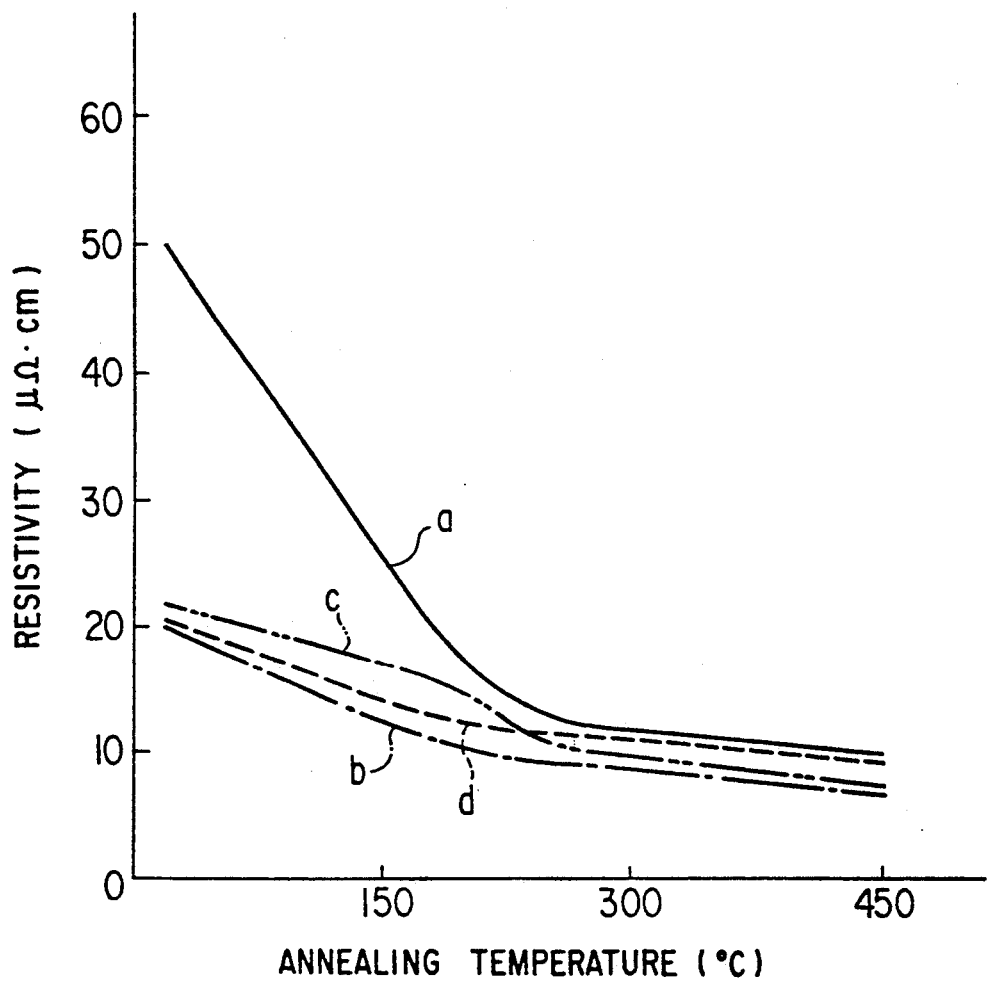
FIG. 2 is a graph showing resistivity characteristics of the conductor materials of the present invention.

As an example, alloy films of Al-Ni (Ni: 11 atomic %), Al-Cu (Cu: 10 or 20 atomic %), and Al-Ti (Ti: 2 atomic %) were deposited by sputtering on a glass substrate, and the electrical resistivity of each film was measured immediately after deposition and after annealing at 150° to 450° C. The results are shown in FIG. 2, in which curve a relates to Al-Ni (Ni: 11 atomic %), curve b to Al-Cu (Cu: 10 atomic %), curve c to Al-Cu (Cu: 20 atomic %), and curve d to Al-Ti (Ti: 2 atomic %).

From these results, it is seen that even Al-Ni film which has a relatively high resistivity can be lowered in resistivity, and by raising the annealing temperature, the resistivity thereof can be reduced to 10 $\mu\Omega$cm or less, which is sufficiently lower than about 45 $\mu\Omega$cm of Mo-Ta alloy. Further, the chemical resistance of these alloy films were measured. As a result, these films, particularly Al-Cu alloy, exhibited a resistance superior to aluminum by three figures or more against an aluminum-etching liquid (a mixed liquid of phosphoric acid, nitric acid and acetic acid) and an ITO-etching liquid (a mixed liquid of hydrochloric acid and nitric acid). Further, it was confirmed that for Al-Cu alloys, a resistance to an etching liquid for $SiO_x$ and $SiN_x$ could be increased by increasing the amount of Cu. Further, by performing annealing, the chemical resistance of the alloy could be remarkably increased over aluminum by three figures, particularly for Al-Cu.

In the present invention, as the annealing atmosphere, an inactive gas such as nitrogen or argon is preferable, but a slight amount (less than 5%) of oxygen may be present, because the oxidized surface of the alloy slightly increases the resistance to the acid.

Figure 3:
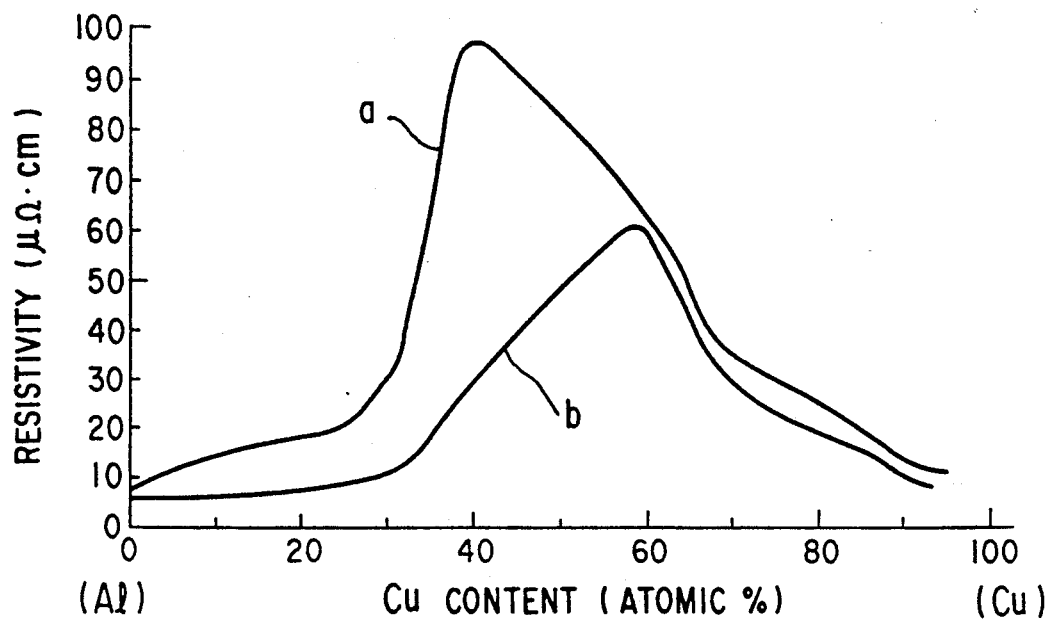
FIG. 3 is a graph showing the relationship between a resistivity and a Cu content of the Al-Cu alloy of the present invention.

Of the Al-Cu alloys of the present invention, Al-Cu alloys containing 0 to 95 atomic % of Cu were deposited by sputtering, and the electrical resistivity was measured immediately after deposition and after annealing at 350° C. The results are shown in FIG. 3, in which curve a relates to the results obtained immediately after deposition, and curve b relates to the results obtained after annealing.

As seen from these results, by the annealing treatment, the resistivity of the Al-Cu alloys could be further lowered, and the resistivity of the Al-Cu alloys containing 30 atomic % or less, or 90 atomic % or more of Cu could be lowered to 10 $\mu\Omega$cm or less.

Figure 4:
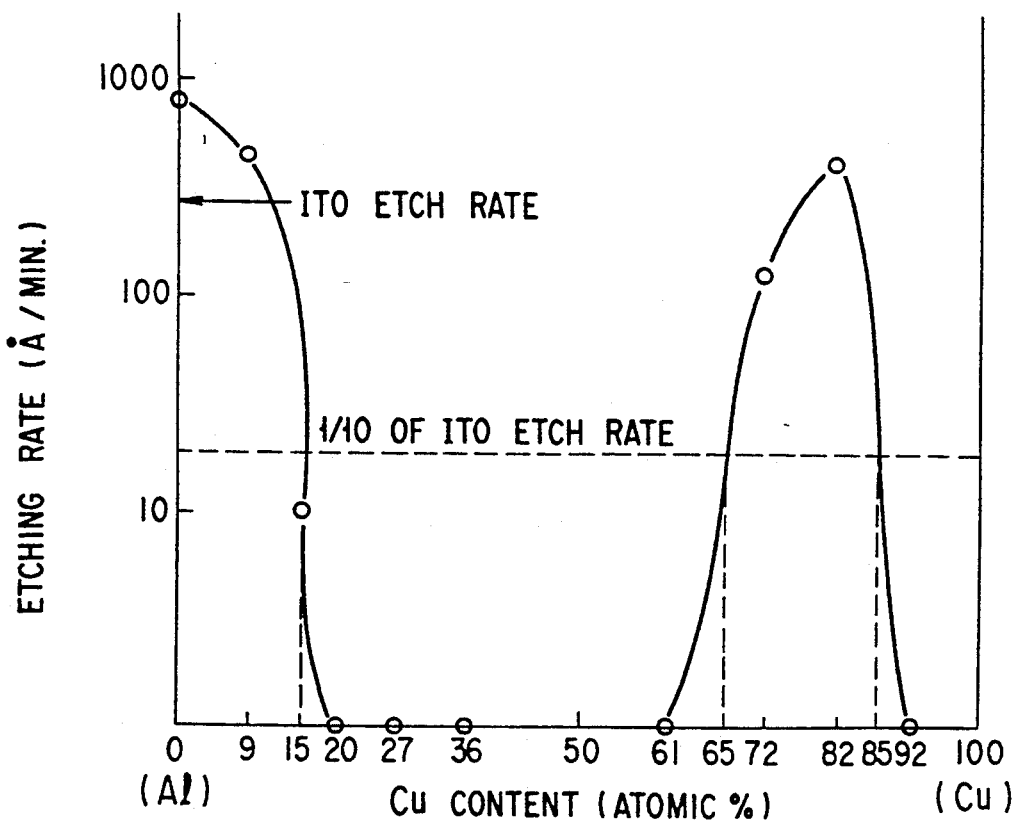
FIG. 4 is a graph showing the relationship between an etching rate by an ITO-etching liquid and a Cu content of the Al-Cu alloy of the present invention.

Further, the chemical resistance of these Al-Cu alloy (after annealing at 350° C. for 60 minutes) was measured. The results are shown in FIG. 4. FIG. 4 relates to the results obtained by using the ITO-etching liquid (a mixed liquid of hydrochloric acid and nitric acid). Incidentally, the etch rate of ITO by the ITO-etching liquid is 200 Å/min. When the etching selectivity of the alloy to ITO is 10 or more, the alloy is satisfactorily employed in manufacturing devices. Thus, the range within which the alloy has such a selectivity is also shown in FIG. 4.

As seen from these results, the alloys containing 15 to 65 atomic % or 85 to less than 100 atomic % of Cu have a satisfactory resistance to the ITO-etching liquid. Further, the chemical resistance, to the aluminum-etching liquid, of the alloys containing 10 to 60 atomic % or 90 to 95 atomic % of Cu was increased over that of aluminum by three figures. Still further, the chemical resistance, to the etching liquid for $SiO_x$ and $SiN_x$, of the alloys containing 90 to 95 atomic % of Cu was increased over that of aluminum by three figures.

In addition to the above alloys, alloy films of Al-Pd (Pd: 12 atomic %) and Al-Ge (Ge: 10 atomic %) were annealed at 350° C., obtaining the resistivity of about 30 and 20 $\mu\Omega$cm, respectively. Further, it was confirmed that by raising the annealing temperature, the resistivity was further lowered.

Figure 5:
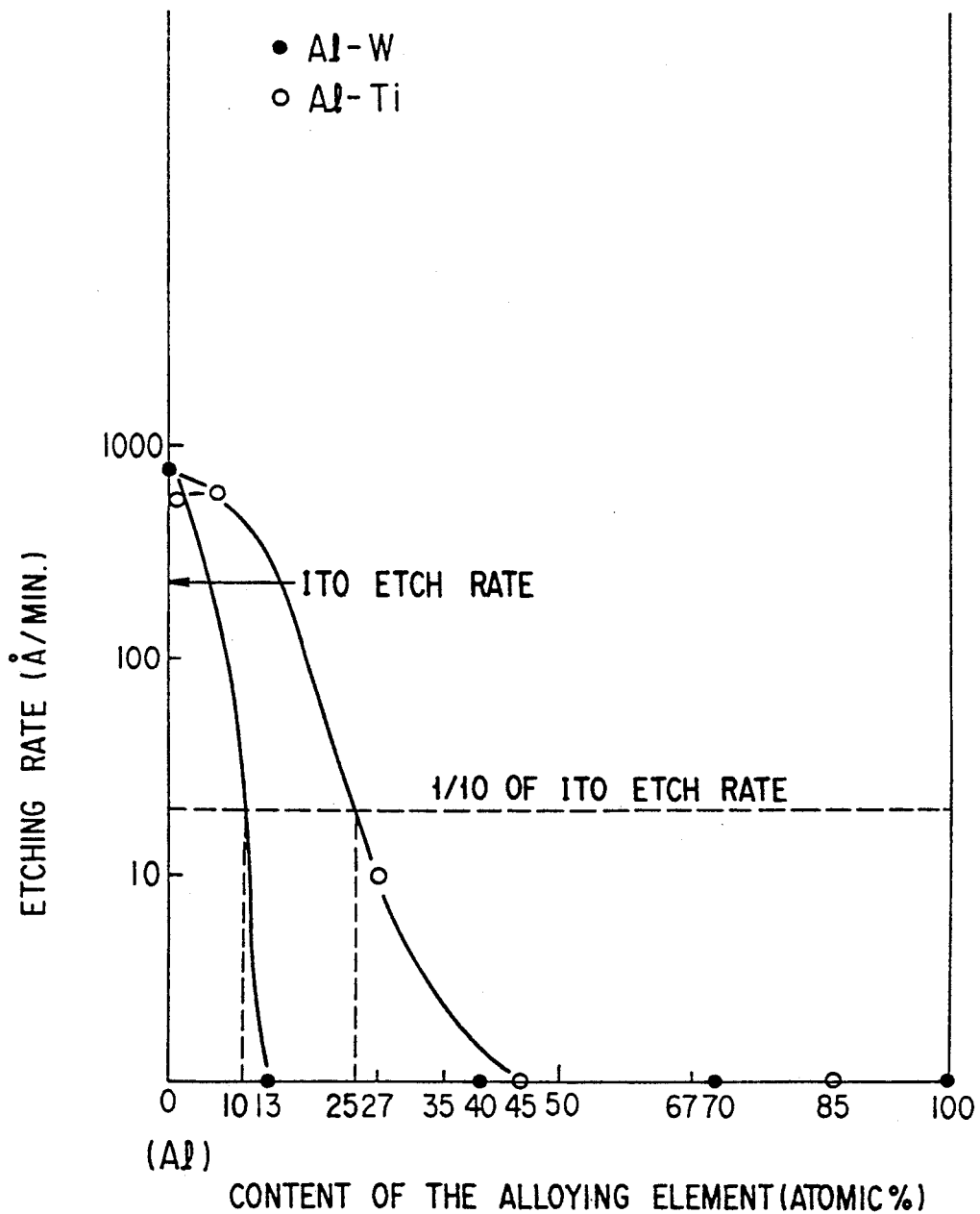
FIG. 5 is a graph showing the relationship between an etching rate by an ITO etching liquid and an alloying element of the other Al alloy of the invention.

Further, the resistance to the ITO etching-liquid was measured for Al alloys other than Al-Cu alloy. The results are shown in FIG. 5. As seen from the results, Al-Ti alloys containing 20 to less than 100% of Ti, and Al-W alloys containing 1 to less than 100% of W have a satisfactory chemical resistance to the ITO-etching liquid.

The conductor material of the present invention can be used to form any wiring layers, in particular gate lines, Cs lines and/or address lines, in active matrix type liquid crystal display devices. Such wiring layers can be formed by simultaneously sputtering a plurality of elements which constitute the conductor material (Al alloy) of the invention on an entire surface of the substrate, and etching the sputtered layer in a predetermined pattern by using, e.g., a phosphoric acid-based etching liquid.

The conductor material of the present invention has a low resistivity and an increased chemical resistance, and can therefore greatly reduce the defects due to the breakage of the lines. Thus, the conductor material of the present invention can realize a liquid crystal display device having a high reliability.

It has been further found that the defects due to the breakage of the lines can be further reduced, while maintaining the advantage of low resistivity, by covering the surface of the wiring layer of the invention with a high-melting metallic material or tantalum oxidic insulating material, or by oxidizing, boriding, carbonizing, or siliciding the surface of the wiring layer of the invention.

The high-melting metallic material which covers the wiring layer of the invention can generally be selected from tantalum, gold, cobalt, chromium, iron, molybdenum, niobium, nickel, palladium, platinum, titanium, tantalum nitride, tungsten, and an alloy thereof. These high-melting metallic material can usually be formed on the wiring layer to a thickness of 0.05 $\mu$m to 3 $\mu$m by the ordinary deposition technique such as sputtering or vacuum deposition. By forming the high-melting metallic protective layer, the chemical resistance of the wiring layer is further increased, preventing the breakage of the lines during etching.

The tantalum oxidic insulating material which covers the wiring layer of the present invention can function also as a gate-insulating film or a Cs line-insulating film. Such a tantalum oxidic insulating material can be represented by the formula:

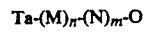

where M represents a metal other than Ta, such as molybdenum, niobium and/or tungsten, n denotes the absence or presence of M and is 0 or 1, and m denotes the absence or presence of nitrogen, N, and is 0 or 1. The tantalum oxidic insulating material includes Ta-O, Ta-N-O, Ta-Mo-N-O, Ta-Nb-N-O, and Ta-W-N-O. The tantalum oxidic insulating material can be formed by sputtering tantalum or co-sputtering tantalum with the other metal in a nitrogen atmosphere to form a Ta-$(M)_n$-N layer, which is anodized in a suitable acid solution such as phosphoric acid or citric acid. The tantalum oxidic insulating material is dense, and has substantially no pinholes, increasing the chemical resistance of the wiring layer.

Further, the tantalum oxidic insulating material can also be directly formed by plasma CVD or thermal CVD, or by thermally oxidizing the corresponding tantalum-based metallic material. Furthermore, the tantalum oxidic insulating material formed by the anodization may further be subjected to thermal oxidation, or the tantalum oxidic insulating material formed by the CVD may further be subjected to anodization.

The tantalum oxidic insulating material not only has the advantage of increasing the chemical resistance of the wiring layer, but also has a very high relative dielectric constant and thus can greatly reduce the area of the TFT and/or storage capacity correspondingly, if used as a gate-insulating film and/or capacitive storage line-insulating film. Further, the tantalum oxidic insulating material has a good adhesivity with an insulating film formed thereon. The tantalum oxidic insulating material is usually formed to a thickness of 0.1 $\mu$m to 0.5 $\mu$m.

The chemical resistance of the wiring layer of the invention and the adhesivity with an insulating film formed on the wiring layer can also be increased by oxidizing, boriding, carbonizing or siliciding the surface of the wiring layer of the invention. In surface-treating the wiring layer, a technique known per se can be used, such as plasma method, thermal method, or ion-implantation. In the case of oxidization, anodization can also be employed. When using the anodization, an alloy of Al with Nb, Ta and/or Ti is particularly preferably used. By these surface treatment, the chemical resistance of the wiring layer of the invention is further increased, more suppressing the defects due to the breakage of the lines. The surface-treated layer usually has a thickness of 0.1 to 1 $\mu$m.

The present invention will now be described in more detail with reference to the drawing, wherein the invention is applied to a driving circuit of an active matrix type liquid crystal display device.

First, an equivalent circuit of the active matrix type liquid crystal display device is explained with reference to FIG. 6.

Figure 6:
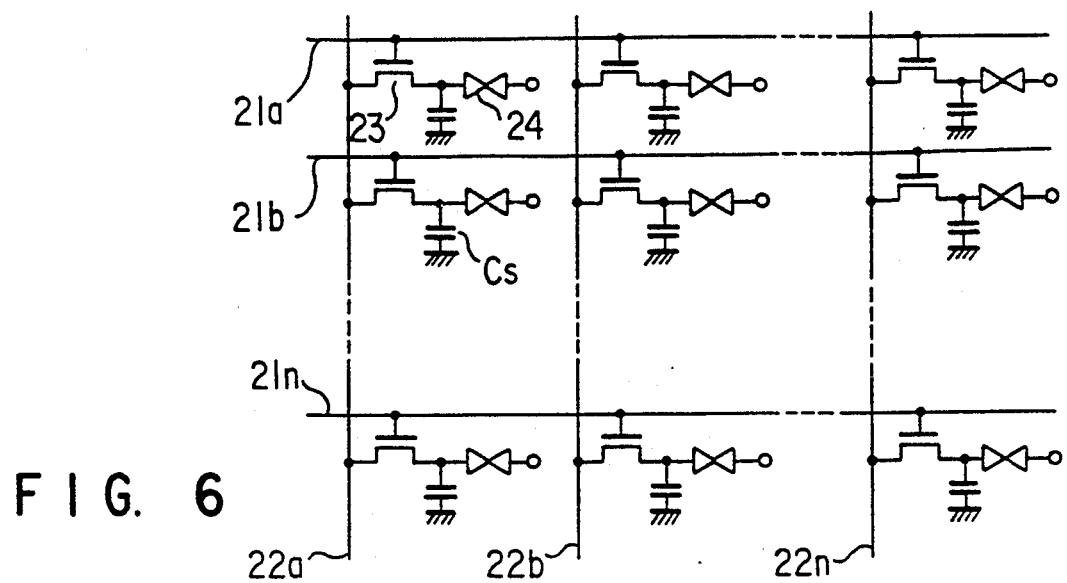
FIG. 6 is an equivalent circuit diagram illustrating an active matrix type liquid crystal display device according to the present invention.

As shown in FIG. 6, address lines 21 (21a—21n) and data lines 22 (22a—22n) are arranged in matrix on a glass substrate (now shown). At the intersections of these lines 21 and 22, a TFT 23 is arranged. The TFT 23 has its gate connected to the address line 21, its drain connected to the data line 22, and its source connected through a pixel electrode to a liquid crystal cell 24. Although the storage capacitor lines Cs are shown in FIG. 6, the Cs lines can be omitted. The gate electrode of the TFT 23 is formed integrally with the address line 21. The address line 21, data line 22 and/or Cs line is formed of the conductor material of the present invention. Usually, the portion of the circuit except for the liquid crystal cell 24 is formed on a transparent substrate such as a glass substrate separately, and is used as a driving circuit board of a liquid crystal display device.

Figure 7:
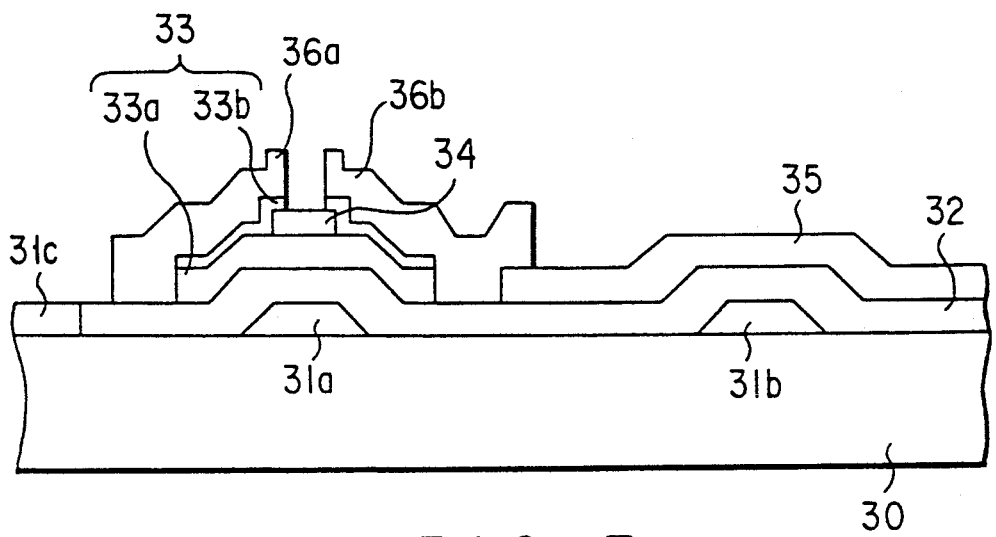
FIG. 7 is a cross-sectional view showing the first embodiment of the present invention.

FIG. 7 shows a unit picture cell structure of a driving circuit board of a liquid crystal display device according to the first embodiment of the present invention. This driving circuit board has a glass substrate 30, on which patterns of gate line 31a, Cs line 31b, and address line 31c, each of which is formed of the conductor material of the invention, are formed. The gate, Cs and address lines are made of, e.g., an Al-Cu alloy (Cu: 20 atomic %) which is a conductor material of the invention, and were simultaneously formed by co-sputtering Al and Cu on the substrate 30, followed by etching with a phosphoric acid-based etching liquid. The lines 31a, 31b and 31c has a thickness of 300 nm.

An insulating film 32 is formed on the substrate 30, covering the gate line 31a and Cs line 31b except for the address line 31c. The insulating film 32 can be formed of $SiO_x$, $SiN_x$ or a laminated film thereof, but here it was a 2-layered film of $SiO_x$ of a thickness of 300 nm and $SiN_x$ of a thickness of 50 nm formed thereon, formed by plasma CVD.

On the portion of the insulating film 32 which positioned above the gate line 31a, an undoped a-Si film 33 is formed to a thickness of about 100 nm. The a-Si film 33 was formed by the conventional CVD, followed by etching.

On the undoped a-Si film 33, a stopper $SiN_x$ film 34 is formed to a thickness of 300 nm by the conventional CVD, followed by etching.

Covering the undoped a-Si film 33 and the stopper SiNx film 34, n+ a-Si film 33b was deposited to a thickness of 50 nm, and Mo was deposited to a thickness of 50 nm, which was patterned to form an a-Si island region 33. After forming a pixel electrode 35 of ITO, contact holes were formed. Then, Mo and Al were deposited to a thickness of 50 nm, and 1 μm, respectively, which were patterned by an-Al etching liquid to form drain electrodes 36a and 36b. Finally, the n+ a-Si was etched by chemical dry etching, finishing a TFT array.

Since the driving circuit board thus obtained uses a conductor material having a resistivity of less than 10 μΩcm which corresponds to ⅓ or ¼ of the value of about 30 to 40 μΩcm of, e.g., the conventionally used Mo-Ta alloy, the line width of the gate line could be reduced, and the opening ratio could be increased. Further, substantially no problem were encountered even if the wiring line length was prolonged correspondingly to a large-area, highly fine, high image quality liquid crystal display device. Further, since the conductor material of the present invention has a superior resistance to the etching liquids for ITO, Al, $SiO_x$ and $SiN_x$, the defects due to the breakage of the lines could be greatly reduce.

Figure 8:
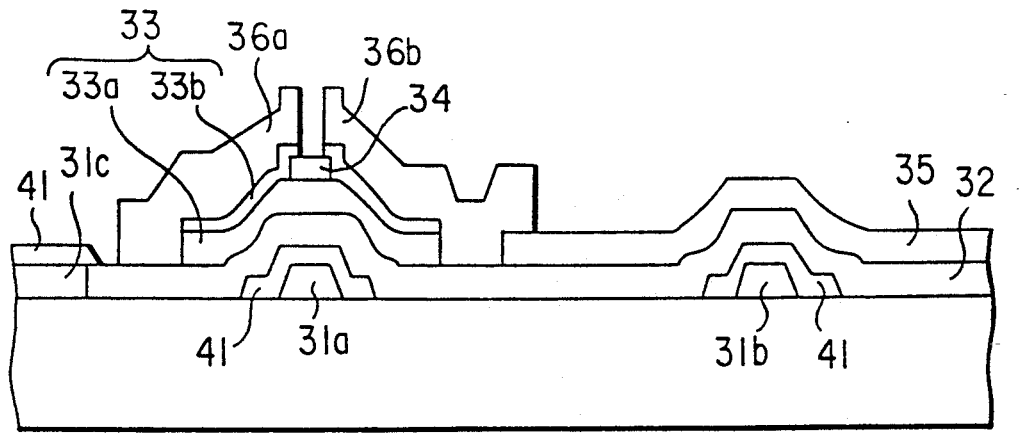
FIG. 8 is a cross-sectional view showing the second embodiment of the present invention.

FIG. 8 is the second embodiment of the invention, wherein the conductor material of the present invention is covered with a high-melting metallic protective layer. This embodiment is identical to the first embodiment, except that after patterning the gate line 31a, Cs line 31b and address line 31c, and before forming the insulating film 32, Ta is formed to a thickness of 100 nm, which is etched to form a protective layer 41 for the wirings. As a high-melting metal, not only Ta, but also any of Au, Co, Cr, Fe, Mo, Nb, Ni, Pd, Pt, Ti, W or an alloy thereof may be used.

According to the second embodiment, in addition to the advantages obtained in the first embodiment, the defects due to the breakage of the lines could be further suppressed by covering the wiring layers with the high-melting metal.

Figure 9:
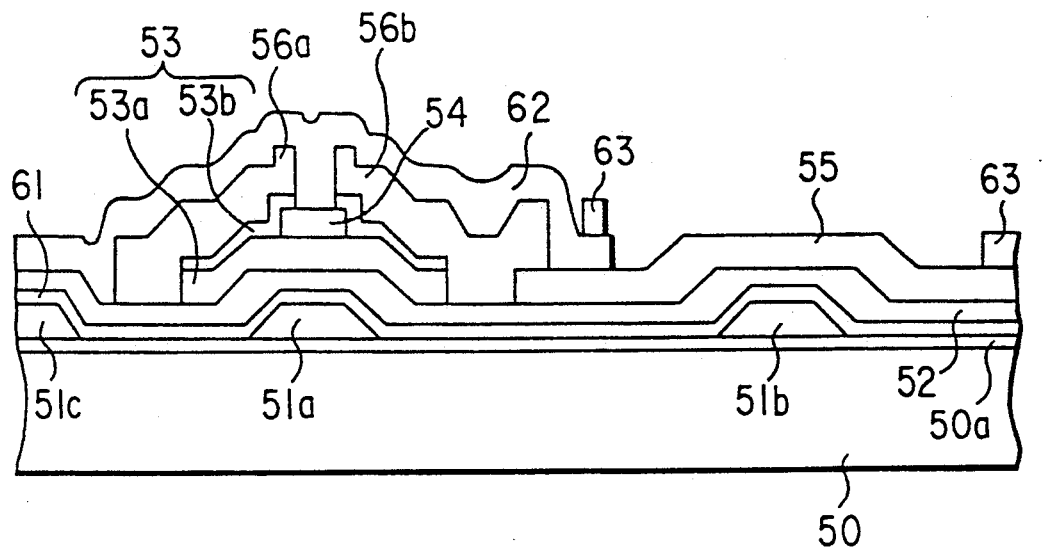
FIG. 9 is a cross-sectional view showing the third embodiment of the present invention.

FIG. 9 shows the third embodiment wherein the conductor material of the present invention is covered with a tantalum oxidic insulating material, which is used also as a gate-insulating film and a storage capacitor-insulating film.

First, on a glass substrate 50 on which an undercoated insulating film 50a was formed, patterns of a gate line 51a, a Cs line 51b, and an address line 51c were formed by co-sputtering Al and Cu to deposit an Al-Cu alloy (Cu: 10 atomic %) which is a conductor material of the invention to a thickness of 300 nm, followed by by etching with a phosphoric acid-based etching liquid.

Then, on the entire surface of the substrate 50, Ta-Nb-N was deposited to a thickness of 100 nm by cosputtering Ta and Nb in a nitrogen atmosphere, which was oxidized in a phosphoric acid solution under a constant current at 0.5 mA/$cm^2$, and then was oxidized under a constant voltage of 110 V, to form a tantalum oxidic insulating film (Ta-Nb-N-O) 61.

Thereafter, a 2-layered insulating film 52 of a 150 nm thick $SiO_x$ and a 50 nm thick $SiN_x$ was formed by plasma CVD.

On the insulating film 52, an undoped a-Si film 53a and a stopper $SiN_x$ film 54 were deposited to a thickness of 100 nm, and 300 nm, respectively, and were etched.

Covering the undoped a-Si film 53a and the stopper SiNx film 54, n+ a-Si film 53b was deposited to a thickness of 50 nm, and Mo was deposited to a thickness of 50 nm, which was patterned to form an a-Si island region 53. After forming a pixel electrode 55 of ITO, contact holes were formed. Then, Mo and Al were deposited to a thickness of 50 nm, and 1 μm, respectively, which were patterned by an Al etching liquid to form drain electrodes 56a and 56b. Then, the n+ a-Si was etched by chemical dry etching (CDE), finishing a TFT array. Further, as a passivation film, Ta-Nb-N-O film 62 was formed by plasma CVD. On the film 62, aluminum was deposited and patterned to form an upper capacitive storage line 63 between the ITO pixel electrodes. The upper capacitive storage line 63 was connected to the lower capacitive storage line 51b outside the TFT array. Finally, the Ta-Nb-N-O film on the display portion was removed by etching.

In the third embodiment described above, the two, upper and lower, capacitive storage lines were formed. However, one of them can be omitted. Further, Ta-Nb-N-O film on the display portion can remain.

Since the driving circuit board thus obtained uses a conductor material having a resistivity of less than 10 μΩcm which corresponds to ⅓ or ¼ of the value of about 30 to 45 μΩcm of, e.g., the conventionally used Mo-Ta alloy, the line width of the gate line could be reduced, and the opening ratio could be increased. Further, substantially no problem were encountered even if the wiring line length was prolonged correspondingly to a large-area, highly fine, high image quality liquid crystal display device. Further, since the conductor material of the present invention has a high resistance to the etching liquids for ITO, Al, $SiO_x$ and $SiN_x$, the defects due to the breakage of the lines during etching could be greatly reduce.

Further, since the Ta-Nb-N-O film which is a tantalum oxidic insulating material has a relative dielectric constant of 28, which is 7 times higher than that of silicon dioxide conventionally used, the area of the TFT and storage capacity could be reduced to about 1/7 of the prior art. Still further, since the Ta-Nb-N-O film formed by anodization has substantially no pinholes, the defects due to the breakage of the wiring layers or lines covered with the film could be greatly reduced.

Figure 10:
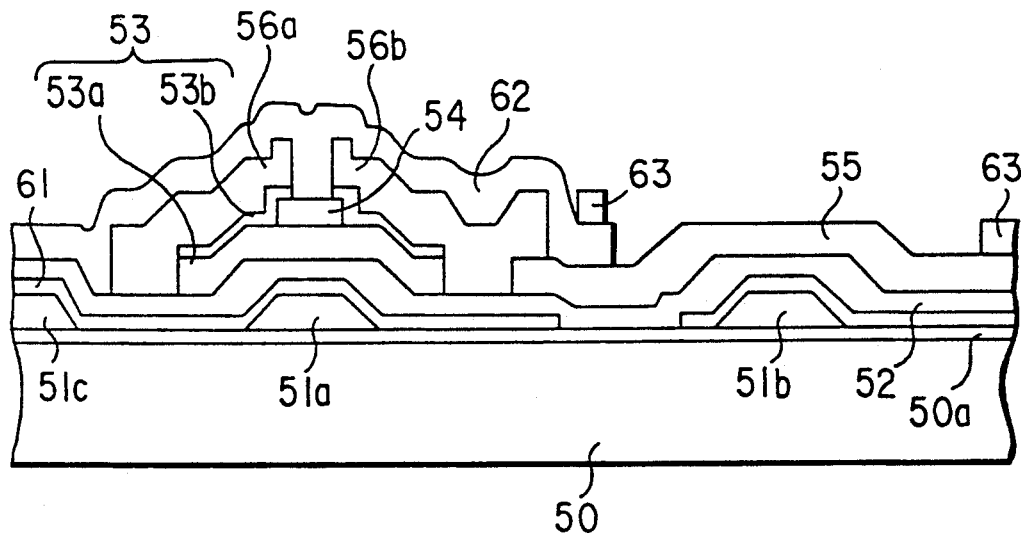
FIG. 10 is a cross-sectional view showing the fourth embodiment of the present invention.

FIG. 10 shows the fourth embodiment, which is identical to the third embodiment except that the tantalum oxidic insulating film on the pixel electrode except for the gate and capacitor lines was removed by etching.

Although the tantalum oxidic insulating material has a high light-transmissivity, it somewhat absorbs light. Hence, by the above-mentioned etching, light-transmissivity was improved. Further, in order to increase ion current of TFT or the storage capacity even to a small extent, the tantalum oxidic insulating material on either the TFT or the storage capacitor line, or the other insulating film such as the silicon oxide or silicon nitride may be removed.

FIG. 11 shows the fifth embodiment, wherein the conductor material of the present invention is surface-treated.

First, on a glass substrate 70, patterns of a gate line 71a, a Cs line 71b, and an address line 71c were formed by co-sputtering Al and Cu to deposit an Al-Cu alloy (Cu: 20 atomic %) which is a conductor material of the invention to a thickness of 300 nm, followed by by etching with a phosphoric acid-based etching liquid.

Then, the surfaces of the lines 71a and 71b were nitrided by nitrogen ion-implantation to form an aluminum nitride layer 81.

Thereafter, a 2-layered insulating film 72 of a 300 nm thick $SiO_x$ and a 50 nm thick $SiN_x$ was formed by plasma CVD.

On the insulating film 72, an undoped a-Si film 73a and a stopper $SiN_x$ film 74 were deposited to a thickness of 100 nm, and 300 nm, respectively, and were etched.

Covering the undoped a-Si film 73a and the stopper $SiN_x$ film 74, n+ a-Si film 73b was deposited to a thickness of 50 nm, and Mo was deposited to a thickness of 50 nm, which was patterned to form an a-Si island region 73. After forming a pixel electrode 75 of ITO, contact holes were formed. Then, Mo and Al were deposited to a thickness of 50 nm, and 1 μm, respectively, which were patterned by an Al etching liquid to form drain electrodes 76a and 76b. Then, the n+ a-Si was etched by chemical dry etching (CDE), finishing a TFT array.

In the fifth embodiment described above, the nitridation was performed by ion-implantation of nitrogen. However, it can be effected by plasma nitridation using nitrogen gas or ammonia gas, or thermal nitridation.

Since the driving circuit board thus obtained uses a conductor material having a resistivity of less than 10 μΩcm which corresponds to ⅓ or ¼ of the value of about 30 to 45 μΩcm of, e.g., the conventionally used Mo-Ta alloy, the line width of the gate line could be reduced, and the opening ratio could be increased. Further, substantially no problem were encountered even if the wiring line length was prolonged correspondingly to a large-area, highly fine, high image quality liquid crystal display device. Further, since the conductor material of the present invention has a superior resistance to etching liquids for ITO, Al, $SiO_x$ and $SiN_x$, the defects due to the breakage of the lines during etching could be greatly reduce.

Further, since the chemical resistance of the wiring layers or lines was further increased by the surface treatment, the defects due to the breakage of the wiring layers could be greatly reduced.

FIG. 12 shows the sixth embodiment, wherein the conductor material i the fifth embodiment is covered with a high-melting point metallic protective layer. This embodiment is identical to the sixth embodiment, except that after nitriding the gate line 71a, Cs line 71b and address line 71c, and before forming the insulating film 72, an Mo-Ta alloy is formed to a thickness of 100 nm, which is etched to form a protective layer 82 for the wirings.

According to the sixth embodiment, in addition to the advantages obtained in the fifth embodiment, the defects due to the breakage of the lines could be further suppressed by covering the wiring layers with the high-melting point metal.

When the conductor material of the present invention is used to form data lines, advantages similar to those described above can be obtained. Further, the present invention has been described with reference to the case where the present invention applied to a liquid crystal display device using a reverse stagger type TFT. However, the present invention can also be applied to a liquid crystal display device using an etch stopper/reverse stagger type, back-channel out/reverse stagger type, or stagger type TFT. Furthermore, the semiconductor film of the TFT should not be limited to an a-Si film. It can also be formed of a polysilicon film. In addition, an undercoated insulating film and a passivation film may be formed in the first and second embodiments. Still further, the present invention can be applied not only to a liquid crystal display device, but also to a CCD or PSID.

In the present invention, "alloy" does not exclude the presence of unavoidable impurities.

Incidentally, although the conductor material of the present invention comprises an alloy of aluminum with a high-melting metal as described above, it has been found that similar alloys using gold, copper, platinum or silver instead of aluminum can exhibit similar advantages.

As has been described above, according to the present invention there is provided a multi-layered conductor structure device which has an electrical conductor layer having a low resistivity, a high resistance to chemicals, particularly a high etching resistance to an etching liquid for ITO, and good adhesivity with a substrate.

Further, in order to further alleviate defects due to the breakage of the first layer, the first conductor layer can be covered with a high-melting point metal, or a tantalum oxidic insulating material. In particular, since the tantalum oxidic insulating material has a high specific dielectric constant, it can greatly reduce the areas of TFT and storage capacity.

In addition, the chemical resistance of the first conductor layer can be further increased and also the adhesivity of the first conductor layer with an insulating film formed thereon can be increased, by oxidizing, nitriding, boriding, carbonizing or siliciding the surface thereof.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A device having a multi-layered conductor structure comprising:
   a substrate;
   a first conductor layer formed on the substrate, which provides an electrode or wiring;
   an insulating film covering the first conductor layer and the substrate; and
   a second conductor layer formed on the insulating film, and comprising an indium tin oxide, which provides an electrode or wiring;
   wherein said first conductor layer is formed of an alloy of aluminum with at least one element selected from copper, gold, boron, bismuth, cobalt, chromium, germanium, iron, molybdenum, niobium, nickel, palladium, platinum, tantalum, titanium, tungsten, and silver.

2. The device according to claim 1, wherein said first conductor layer comprises an aluminum-copper alloy containing 10 to 95 atomic % of copper.

3. The device according to claim 1, wherein said first conductor layer is covered with a high-melting point metallic material or a nitride thereof.

4. The device according to claim 1, wherein said first conductor layer is covered with an insulating material comprising a tantalum oxide or an oxide containing tantalum.

5. The device according to claim 1, wherein the surface of said first conductor layer is oxidized, nitrided, borided, carbided or silicided.

6. A driving circuit board for liquid crystal display device comprising:
   a substrate;
   a first conductor layer formed on the substrate, which provides an electrode or wiring;
   an insulating film covering the first conductor layer and the substrate; and
   a second conductor layer formed on the insulating film, and comprising an indium tin oxide, which provides an electrode or wiring;
   wherein said first conductor layer is formed of an alloy of aluminum with at least one element selected from copper, gold, boron, bismuth, cobalt, chromium, germanium, iron, molybdenum, niobium, nickel, palladium, platinum, tantalum, titanium, tungsten, and silver.

7. The circuit board according to claim 6, wherein said first conductor layer is formed of an aluminum-copper alloy containing 15 to 65 atomic % or 85 to less than 100 atomic % of copper, and the balance consisting essentially of aluminum.

8. The circuit board according to claim 6, wherein said first conductor layer is formed of an aluminum-titanium alloy containing 25 to less than 100 atomic % of titanium, and the balance consisting essentially of aluminum.

9. The circuit board according to claim 6, wherein said first conductor layer is formed of an aluminum-tungsten alloy containing 10 to less than 100 atomic % of tungsten, and the balance consisting essentially of aluminum.

10. The device according to claim 1, wherein said aluminum alloy is resistant to an indium tin oxide-etching liquid.

11. The circuit board according to claim 6, wherein said aluminum alloy is resistant to an indium tin oxide-etching liquid.

12. The device according to claim 1, wherein said first conductor layer is formed of an aluminum-copper alloy containing 15 to 65 atomic % or 85 to less than 100 atomic % of copper, and the balance consisting essentially of aluminum.

13. The device according to claim 1, wherein said first conductor layer is formed of an aluminum-titanium alloy containing 25 to less than 100 atomic % of titanium, and the balance consisting essentially of aluminum.

14. The device according to claim 1, wherein said first conductor layer is formed of an aluminum-tungsten alloy containing 10 to less than 100 atomic % of tungsten, and the balance consisting essentially of aluminum.

15. A device having a multi-layered conductor structure comprising:
   a substrate;
   a first conductor patterned layer formed on the substrate, which provides an electrode or wiring, said first conductor layer comprising an alloy of aluminum with at least one element selected from copper, gold, boron, bismuth, cobalt, chromium, germanium, iron, molybdenum, niobium, nickel, palladium, platinum, tantalum, titanium, tungsten, and silver;
   an insulating film covering the first conductor layer and the substrate; and
   a second conductor patterned layer formed on the insulating film, and comprising an indium tin oxide, which provides an electrode or wiring, said second conductor patterned layer having been patterned with an indium tin oxide-etching layer after said first conductor patterned layer and said insulating film have been formed on said substrate.

16. The device according to claim 15, wherein said aluminum alloy is resistant to an indium tin oxide-etching liquid.

17. The device according to claim 15, wherein said first conductor patterned layer is formed of an aluminum-copper alloy containing 15 to 65 atomic % or 85 to less than 100 atomic % of copper, and the balance consisting essentially of aluminum.

18. The device according to claim 15, wherein said first conductor layer is formed of an aluminum-titanium alloy containing 25 to less than 100 atomic % of titanium, and the balance consisting essentially of aluminum.

19. The device according to claim 15, wherein said first conductor layer is formed of an aluminum-tungsten alloy containing 10 to less than 100 atomic % of tungsten, and the balance consisting essentially of aluminum.

* * * * *